July 28, 1931. F. KURATH 1,816,680
ELECTRICAL COIL AND METHOD OF MANUFACTURING SAME
Filed Sept. 3, 1929
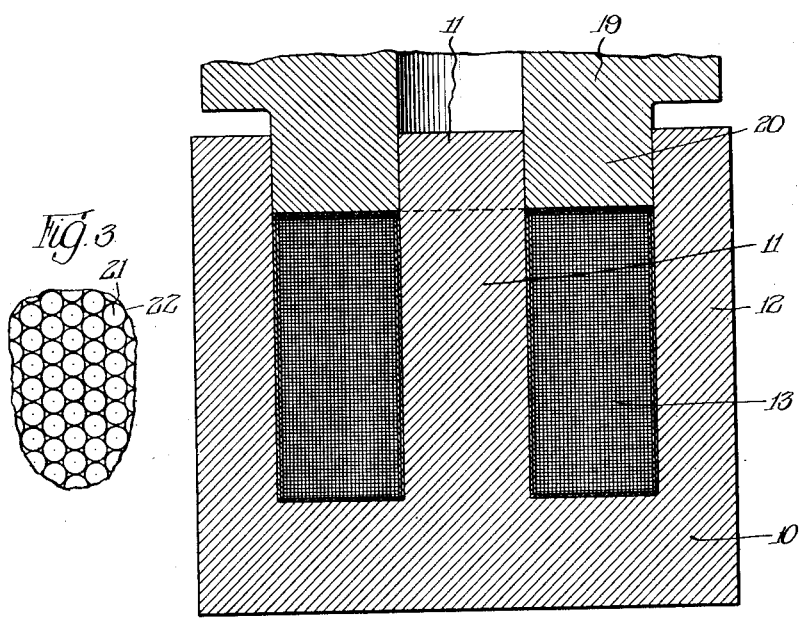

Patented July 28, 1931                                              1,816,680

UNITED STATES PATENT OFFICE

FRANZ KURATH, OF CHICAGO, ILLINOIS, ASSIGNOR TO ECONOMY FUSE AND MANUFACTURING COMPANY, OF CHICAGO, ILLINOIS, A CORPORATION OF NEW YORK

ELECTRICAL COIL AND METHOD OF MANUFACTURING SAME

Application filed September 3, 1929. Serial No. 389,965.

This invention relates to improvements in a molded electrical coil and the method of making the same and more particularly to improvements which consists in impregnating a coil and subsequently molding the coil under pressure.

The customary manner of wiring electrical coils as for example solenoid coils, necessarily results in a large percentage of internal voids or minute air spaces. Electrical coils do not have sufficient strength to be handled in assembling without additional bracing means and further due to the internal voids cannot be used at high temperatures without deterioration. It has been previously proposed to impregnate the coil for insulation purposes and to impart strength and rigidity to the coil. Thus in the prior patent to Baekeland 1,213,726 issued January 23, 1917, there is a disclosure of treating an electrical coil by impregnation through the use of a fluid phenolic condensation product. The coil after being impregnated is subjected to heat and gas pressure in order to react the condensation product in situ to transform it into a homogeneous, impervious, insoluble, and infusible body serving as a support and an insulator for the coil windings. The objections to Baekeland's process are several. It is practically impossible to close up all the voids by impregnation even under a vacuum especially if the coil is unusually thick. Baekeland's process necessarily excludes the use of a solvent for the initial condensation product, since the driving off of the solvent would result in leaving internal voids.

It is the purpose of my invention to provide an improved method of preparing an electrical coil which consists in first impregnating the coil with a varnish consisting of a fluid resin thinned with a suitable solvent; drying the coil at a low heat to drive off the solvent and subsequently reacting the resin by applying heat and molding pressure to the coil. In carrying out these steps it will be apparent that it is immaterial whether a large percentage of voids result upon the driving off of the solvent since the final step of molding the coil will compact the windings of the coil and close up all the voids.

It is further the purpose of the present invention to provide improved electrical coils formed by the improved method having materially increased electric efficiencies in that:—the coil of the present invention has more turns per unit of cross section than is possible with hand or machine winding; it has a high heat conductivity which results in a correspondingly increased current carrying capacity since the coil may be used at a higher temperature as the heat radiates faster from the coil; it further may be manufactured exactly to desired dimensions due to the molding step thereby rendering subsequent assembly in apparatus relatively easier; it further has greater strength since the bonding, insulating and supporting body is closely incorporated with the fibrous covering of the wire winding which thereby acts as a filler for the resinous bonding material.

Further objects and advantages will be more readily apparent from the following description taken in connection with the attached drawings in which:—

Figure 1 illustrates the impregnated coil in a press before the molding pressure is applied, Figure 2 illustrates the coil after it has been compressed by the molding operation, Figure 3 is an enlarged partial section of a coil which has been molded, and Figure 4 is an enlarged partial section of a modified form of coil before the application of molding pressure.

In my method, the coil is first wound in the usual manner. It is desired that the covering of the wire be of some suitable fabric rather than enamel and I have found that excellent results will be obtained if the customary double cotton covering be used. The coil, if so desired, may be impregnated during the winding operation by painting the turns with the resin, but in the preferred method, the coil after being wound is subjected to a vacuum to exhaust the air from the internal voids and then the impregnating fluid is allowed to fill the container and may, if so desired, be forced into the coil under pressure. It is obvious that if the coil is substantially thick, it is difficult to thoroughly impregnate the coil especially if the impregnating fluid is too thick to flow into the internal windings. It is, therefore, necessary to thin the resin with a suitable solvent which is later driven off from the coil by a drying operation. Various solutions have been used as the impregnating fluid, some of which are the type which remain fusible and they are, therefore, liable to soften upon a rise in temperature of the coil. Thermal setting resins have also been used but in the use of such resins, if the reaction produces water, it is difficult to thoroughly dry out the coil. The driving out of the solvent and the heating of the coil to cause the reaction of the thermal setting resin necessarily leaves internal voids within the coil.

In my improved method the coil, after being wound and impregnated with a thermal setting resin or varnish is dried to drive off the solvent and is then placed in a mold in which the molding pressure, together with the application of heat, will compress the coil to a solid compact mass which is entirely homogeneous throughout its section. It has been found that the reduction in length of the coil may be substantially 20%.

In Figure 1, I show a lower mold block 10 having an upstanding central post 11 and a cylindrical outer wall 12. The coil 13 is placed in the annular opening of the lower mold block 12 and, if so desired, a canvas strip 14 may be placed at the lower end of the coil while the inner end of the coil winding 15 is brought out between a pair of canvas strips 16 and 17 placed on top of the coil. The other end of the coil is shown at 18. If desirable, connectors may be molded on to the ends of the wires at the same time. The upper mold block 19 is formed with a depending annular ring 20 which is designed to fit the opening formed in the lower mold block. The upper mold block is forced down by a suitable press and will compact the coil substantially to the position shown in Figure 2. During the molding operation the mold blocks may be heated in any suitable manner in order to carry out the reaction of the thermal setting resin. The formed coil may be cooled while it is in the mold and then removed.

It is obvious that the pressing and compacting operation will result in closing all the internal voids and form a coil in which the insulation is homogeneous throughout the cross section. The coil will have a higher electrical efficiency since the turns of the windings will occupy less volume. The current carrying capacity of the coil will be relatively high since the coil will have a higher heat conductivity. The assembling of the coil is rendered relatively more easy since it can be molded exactly to the desired dimensions. A further insulation, if desired, of an outer covering of a phenolic condensation product may be molded on to the coil by using resin in a powdered or sheet form. In general, the method is suitable for coils of round wire but advantageous results will also be secured if a square wire is utilized.

I have shown the molding operation as carried out by pressing the coil endwise, but it is entirely possible that the coils of the shape shown, or other forms, could be pressed in different directions.

As shown in Figure 3 the individual wires 21 are closely pressed into contact. The insulation coverings 22 of the wire will be deformed and pressed into the spaces between the wires and thereby serve as a filler for the resinous bonding material.

If additional filler is needed to give further strength I may wind in between the windings 20 turns of string 23 of a suitable fibrous material. In such a coil after treatment as above described the strings 23 will become thoroughly impregnated with the resin and act as binder after molding the voids will all be closed by compacting of the string 23.

I claim:

1. The method of making electrical coils which consists in forming a coil having closely spaced windings, impregnating the coil by a fluid thermo-setting resin, subjecting the impregnated coil to heat and a molding pressure to react the resin and to materially compress the coil windings in order to substantially reduce the space between the inner windings.

2. The method of making electrical coils which consists in forming a coil having closely spaced windings, impregnating the coil by a fluid thermo-setting resin, subjecting the impregnated coil to heat and molding the coil by applying sufficient mechanical pressure endwise to the coil to materially reduce the space between the coil windings both inner and outer.

3. The method of forming substantially dense and rigid electrical coils comprising winding the coil, subjecting the coil to a subnormal pressure, impregnating the coil with a fluid resin thinned by a solvent, driving off the solvent by applying low heat and finally subjecting the coil to molding pressure and heat to materially and internally compress the coil windings and react the resin.

4. The method of making electrical coil which consists in preparing a coil having a plurality of turns arranged in closely spaced relation and in multiple layers, impregnating the coil from without by a fluid thermo-setting resin to fill a large portion of the internal voids, applying mechanical molding pressure to the impregnated coil to close the remaining voids, to force the turns of wire into the impregnating material and to materially and internally compress the turns and finally applying heat to transform the resin into an infusible, insulating, form-sustaining body.

5. The method of making electrical coils which consists in impregnating a coil winding with a thermo-reactive resin thinned by a solvent, driving off the solvent by low heating and molding the coil by applying heat thereto and mechanical molding pressure whereby a reaction takes place to transform the resin into an infusible body and whereby the total non-conductive space within the bounds of the coils is substantially reduced.

6. An electrical coil comprising a multi-layer coil winding, the inner and outer turns of which are tightly compressed into materially closer relation than can be obtained by winding the coil, the coil windings being insulated, supported and prevented from displacement by an impregnating body of an infusible phenolic condensation product, said body extending continuously through the coil uninterrupted by the presence of internal voids.

7. An electrical coil, the windings of which are completely imbedded in an infusible phenolic condensation product substantially free from internal voids, the inner coil windings being compressed into materially closer relation than, can be obtained by winding the coil.

8. An electric coil, the windings of which are imbedded in an infusible phenolic condensation product, the inner and outer coil windings of which have been compressed by mechanical pressure into materially closer relation than can be obtained by winding the coil.

Signed at Chicago, Illinois, this 28th day of August, 1929.

FRANZ KURATH.